United States Patent [19]

Bisiach

[11] 4,453,883

[45] Jun. 12, 1984

[54] INDUSTRIAL ROBOT

[76] Inventor: Luciano Bisiach, Strada S. Vito-Revigliasco 350, Turin, Italy

[21] Appl. No.: 381,157

[22] Filed: May 24, 1982

[30] Foreign Application Priority Data

Feb. 5, 1982 [IT] Italy ............................. 67136 A/82

[51] Int. Cl.³ ............................................ B25J 17/02
[52] U.S. Cl. .................................. 414/735; 414/742; 414/917
[58] Field of Search ................... 414/736, 917, 730, 4, 414/729, 735, 738–741

[56] References Cited

FOREIGN PATENT DOCUMENTS

| | | | |
|---|---|---|---|
| 61153 | 9/1982 | European Pat. Off. ............ | 414/730 |
| 52-20552 | 2/1977 | Japan .................................. | 414/917 |
| 623732 | 7/1978 | U.S.S.R. ............................. | 414/917 |

Primary Examiner—Robert J. Spar
Assistant Examiner—Terrance L. Siemens
Attorney, Agent, or Firm—Paul and Paul

[57] ABSTRACT

An industrial robot having several axes of movement and comprising a base mounted for linear or pivotal movement, a pair of angularly movable parallelogram leverages and a toolholder head movable by the leverages and supporting a tool such as a welding torch. The toolholder head has two degrees of freedom of pivotal movement. The tool supported thereby is centered in a fixed point of focus irrespective of the position of the toolholder head and the tool can be adjusted without changing this point of focus merely by adjusting the toolholder head without adjusting other axes of movement of the robot.

6 Claims, 7 Drawing Figures

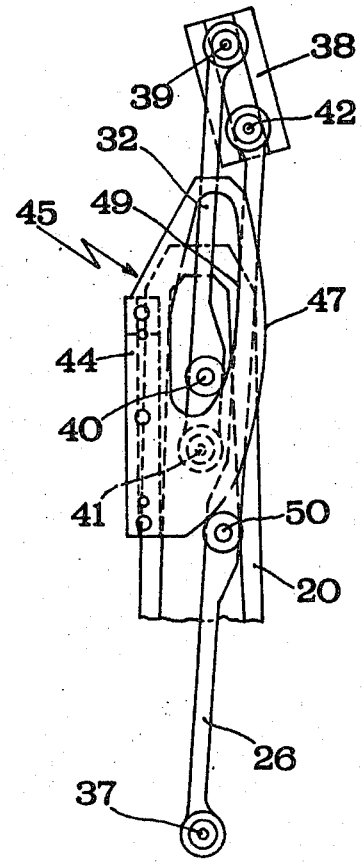
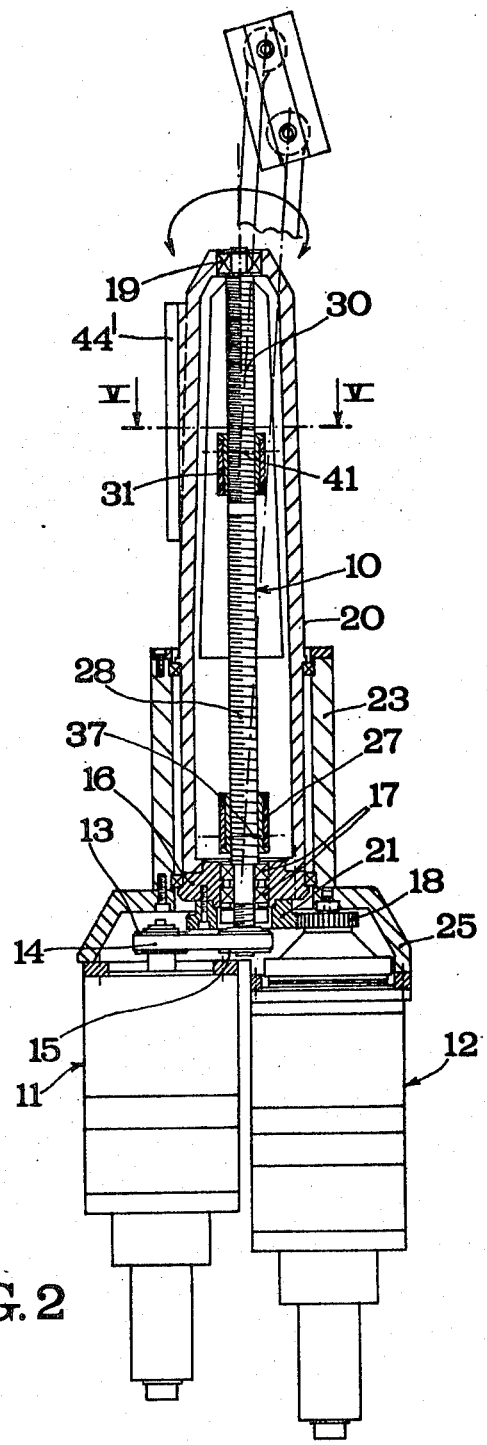
FIG. 3
FIG. 2

INDUSTRIAL ROBOT

BACKGROUND OF THE INVENTION

This invention relates to an industrial robot having a plurality of axes of movement and a fixed focus toolholder head.

Although the robot according to the present invention is designed as a multifunctional working machine it is particularly adapted for use in Tungsten Inert Gas, Metal Inert Gas, and Metal Active Gas, hereinafter referred to as TIG, MIG and MAG arc welding, respectively.

TIG, MIG and MAG welding robots are known in which the welding torch is supported by a toolholder having two or more degrees of freedom of movement so that the torch tip carries out a rotary movement in the space. As the welding torch is in a fixed position with respect to the toolholder that supports it, considerable problems are encountered in programming the movements of the robot when it is necessary to adjust the focus of the welding torch during its operation to achieve best results. In fact, any modification of the path or location of the welding torch involves a more general modification of the attitude of the robot including a correction of the movement of other axes which are not those defining the movement of the toolholder head. Even for making a minute correction in the location of the welding torch such programming of the robot is an extremely difficult and complex operation.

It is an object of the present invention to eliminate these drawbacks and particularly to reduce the complexity of programming by providing a robot having a plurality of axes of movement so as to permit the location of the welding torch to be modified or corrected only by rotary or angular movements of the head of the robot while constantly maintaining the welding torch in centered position without adjusting the other axes of movement of the robot or its overall attitude. This ability to maintain the tool holder and thus the welding torch as constantly centered while permitting the toolholder to be moved in accordance with its degrees of freedom is referred to herein as maintaining a "fixed focus" or having a "fixed point of focus".

SUMMARY OF THE INVENTION

The invention provides an industrial robot having a plurality of axes of movement. It comprises: a base mounted for linear or pivotal movement; a first angularly movable parallelogram leverage mounted for pivotal movement on a fixed support of the base; a second angularly movable parallelogram leverage mounted for pivotal movement on top of the first leverage; a fixed toolholder head support connected to a distal end of the second leverage, and a fixed focus toolholder head capable of carrying out two angular movements and supporting a toolholder. This robot is characterized in that the toolholder head substantially comprises a threaded shaft having a first portion coupled to a first lead nut for imparting a translating movement to a first pair of parallel levers and a second portion coupled to a second lead nut for imparting translating movement to a second pair of parallel levers, said first portion of said threaded shaft having a length and pitch about twice the length and pitch of said second portion, said pairs of parallel levers supporting at their distal ends said toolholder, and a tubular rotatable jacket extending coaxially of and surrounding said threaded shaft and provided with guide means engaging guide members on said pairs of levers to produce relative movement of the latter and thereby an angular displacement of the toolholder about its longitudinal axis and a fixed point of focus. The guide means for producing relative movement of the pairs of levers may advantageously be formed by a pair of flat members each having a differently curved profile.

BRIEF DESCRIPTION OF THE DRAWINGS

FIG. 2 is a side elevational view, partly in section, of a toolholder head incorporated in the robot of FIG. 1;

FIG. 3 shows a part of the toolholder head not shown in FIG. 2;

DESCRIPTION OF PREFERRED EMBODIMENT

Figure 1:
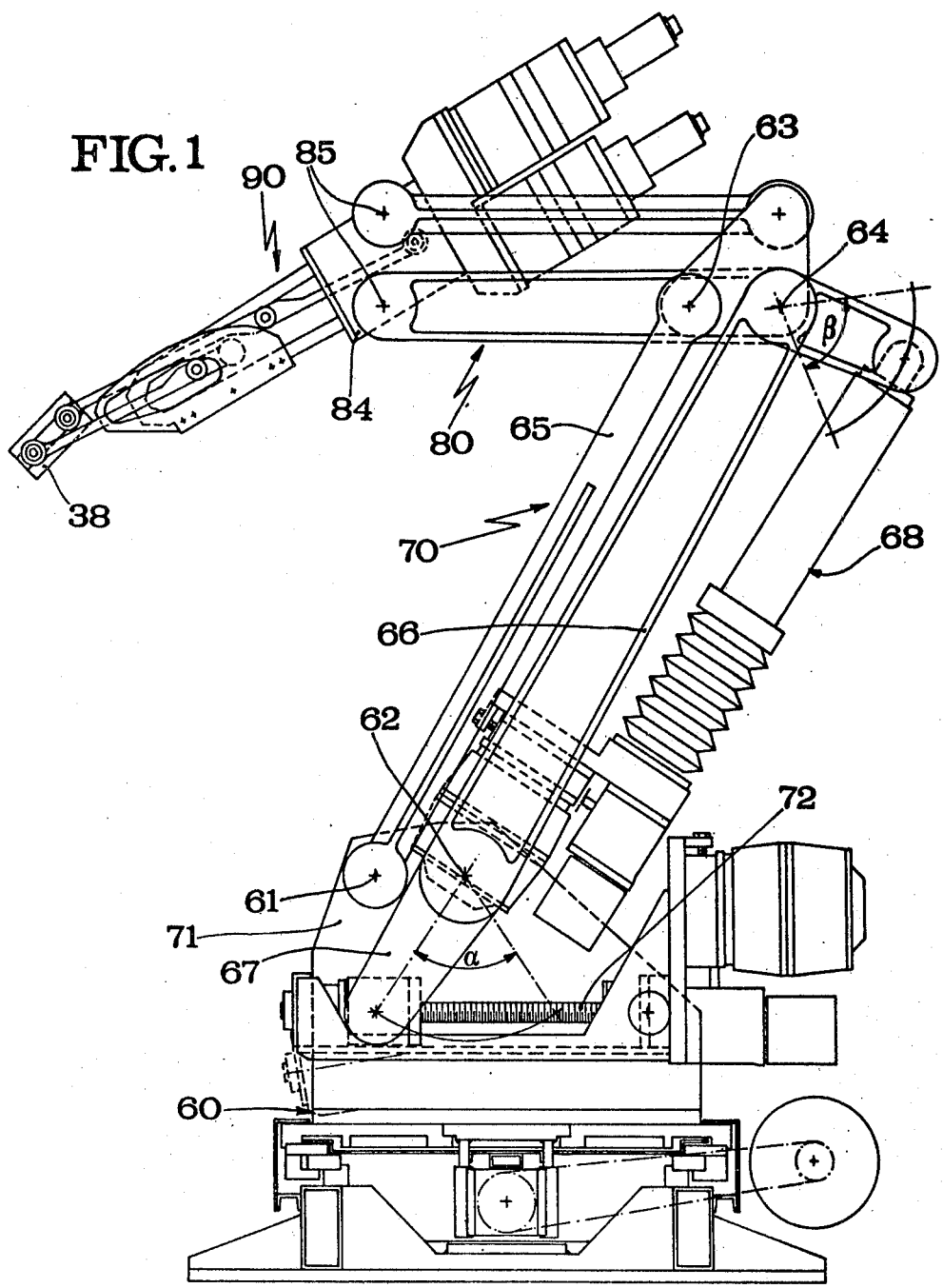
FIG. 1 is a side elevational view of an industrial robot having a plurality of axes of movement according to a preferred embodiment of the present invention.

Referring to FIG. 1, an industrial robot having a plurality of axes of movement according to a preferred embodiment of the present invention substantially comprises a base 60 mounted for linear translating movement on a supporting carriage as is known in the art; a first angularly movable parallelogram leverage 70 mounted for pivotal movement on a fixed support 71 of the base 60; a second angularly movable parallelogram leverage 80; a toolholder head support 84 secured at 85 to a distal end of the second parallelogram leverage 80; a fixed focus toolholder head 90 capable of carrying out two angular movements and connected to the fixed toolholder head support 84, and a toolholder 38 pivotally mounted at a distal end of the toolholder head 90. In this preferred embodiment of the invention, the base 60 of the robot is mounted for linear translating movement; however, it may evidently also be mounted for angular movement as desired or required.

A second degree of freedom of movement is imparted to the robot by the parallelogram leverage 70 which permits it to carry out a pivotal movement. Parallelogram linkage 70 comprises a pair of levers 65 and 66 pivotally mounted at their ends 61, 62, 63 and 64. This linkage has a degree of pivotal movement of about 70° through an angle α and is moved by a conventional worm and lead screw system including rotating balls. During angular movement of linkage 70 about the point 62 also the worm 72, to which lever 66 is connected through a member 67, undergoes a certain angular displacement, as is shown by the dash-and-dot line position of its end portion.

A third degree of freedom of movement, again of a pivotal type, is imparted to the robot by parallelogram linkage 80 which is pivotally mounted on top of parallelogram linkage 70. Parallelogram linkage 80 is capable of angular movement through an angle β of about 75°. Angular movement is imparted to parallelogram linkage 80 by a worm and lead screw system 68 including rotating balls and arranged parallel to parallelogram linkage 70.

As the two parallelogram linkages 70 and 80 move individually or jointly they keep the toolholder head support 84 in a constantly fixed position relative to the horizontal plane so that also the position of the toolholder head 90 relative to the horizontal plane does not change although the kinematic features described above permit the toolholder head to move to any position in space that can be reached by the robot.

Figure 7:
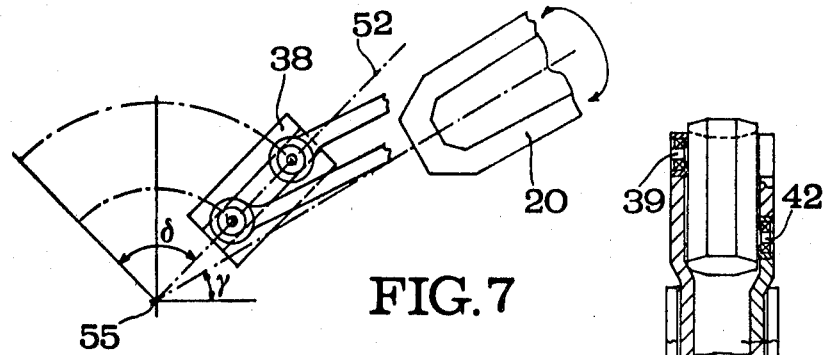
FIG. 7 illustrates the movements of the toolholder head.

The toolholder head assumes an inclined position relative to the horizontal plane and the geometrical longitudinal axis of the toolholder head defines an angle γ relative to the horizontal plane, as shown in FIG. 7. This angle is determined while the robot is being designed and in a preferred embodiment it is about 30°. After this fixed and constant location of the toolholder head for any movement thereof has been determined as described above, the toolholder head has two further degrees of pivotal movement during which the longitudinal axis of the toolholder head may rotate about a center in a fixed point of focus, as will be described in detail hereafter.

The toolholder head 90 of the robot according to the invention is schematically and partly in section shown in FIG. 2. Located within toolholder head 90 is a threaded shaft 10 which is driven by an electric motor 11 coupled directly thereto through a pulley 13, transmission belt 14 and pulley 15. Threaded shaft 10 is accommodated in a tubular rotatable jacket 20 and rotatably mounted therein on bearings 17 arranged in a bottom wall 16 thereof and a bearing 19 at a distal end of jacket 20. Bottom wall 16 of tubular jacket 20 is firmly connected to gear 21 meshing with gear 18 driven by a direct current electric motor provided with a speedometer dynamo and a harmonic drive type coaxial reduction gear, all schematically indicated by 12. Tubular jacket 20 is rotatably mounted in a fixed sleeve 23 firmly secured to a casing 25.

Threaded shaft 10 is divided into two distinct threaded portions 28 and 30. The thread pitch and length of portion 28 are about twice as large as those of portion 30. The first threaded portion 28 screws into a block-shaped lead nut or nut screw 27 and the second threaded portion 30 into a similar lead nut 31. With this arrangement the length of stroke of the lead nut 27 will therefore be twice as large as that of the lead nut 31.

Two pairs of levers are connected to lead nuts 27 and 31, as is more clearly shown in FIGS. 3, 4, 5 and 6. FIG. 3 is a side elevational view of a portion of the toolholder head which is not shown in FIG. 2 and which is located exactly above and aligned with the portion shown in FIG. 2.

Figure 4:
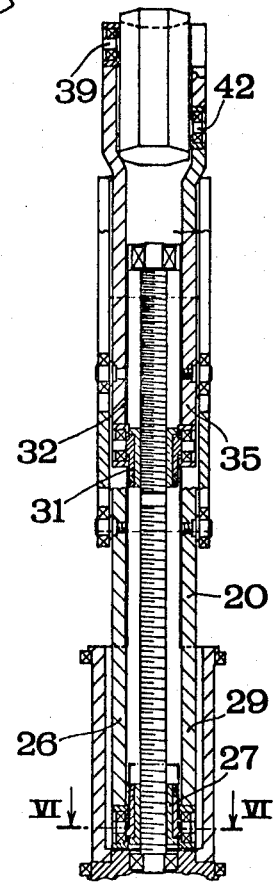
FIG. 4 is a transverse section through the toolholder head showing it in a top plan view.

As shown in FIG. 4, a pair of levers 26 and 29 are connected through bushes 22 and bearings 24 (FIG. 6) to lead nut 27. Similarly a pair of levers 32 and 35 is connected through bushes and bearings to lead nut 31. The reciprocal arrangement of the levers is more clearly shown in FIG. 3 which shows lever 26 connected to lead nut 27 at 37 and lever 32 connected to lead nut 31 at 41.

Levers 26 and 29 are longer than levers 32 and 35 and surmount the latter at 41 by means of a split shaped portion. The two pairs of levers 26, 29 and 32, 35 support a toolholder 38 at their distal ends, toolholder 38 being pivotally connected to the levers at 39 and 42.

Figure 5:
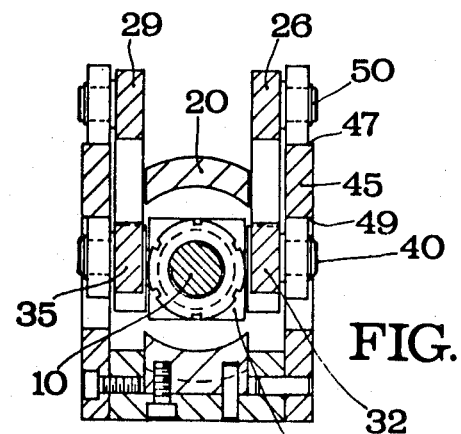
FIG. 5 is a transverse section taken on the line V—V in FIG. 2 and showing also the detail illustrated in FIG. 3.
Figure 6:
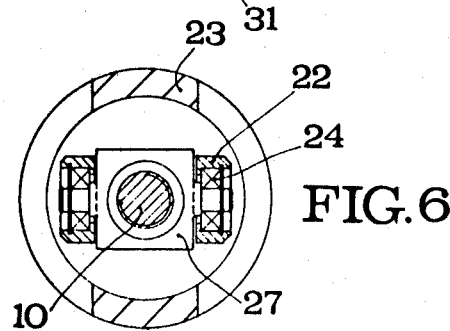
FIG. 6 is a transverse section through the toolholder head of FIG. 4, taken on the line VI—VI in FIG. 4.

FIG. 5 is a cross section taken along the line V—V in FIG. 2 and shows the toolholder head complete with guide means which will be described hereafter. FIG. 6 is a cross section taken along the line VI—VI in FIG. 4 and shows the lead screw 27 with bushes 22 and bearings 24 for connection of the longer pair of levers.

Thus, levers 26 and 29, 32 and 35 are translated along threaded shaft 10 by lead screws 27 and 31, respectively, to which they are connected. As the first portion 28 of threaded shaft 10 has a thread pitch about twice as large as that of the second portion 30, the translation of the longer pair of levers is about twice as large as that of the shorter pair of levers. Simultaneously with the translating movement in the longitudinal direction of threaded shaft 10, the pairs of levers also undergo a relative displacement produced by guide means 45 shown in FIG. 3 and secured to the sides of tubular jacket 20 by the lower portion 44 thereof which matches the profile 44' (FIG. 2) of the tubular jacket.

Guide means 45 comprises a plate formed with an appropriate double curvature defining an outer upper profile 47 and an inner lower profile 49. The inner lower profile 49 is formed by an elongated slot made in the plate. Guide members 50 are secured intermediately of the length of levers 26 and 29 and similar guide members 40 are secured intermediately of the length of levers 32 and 35. Guide members 50 and 40 comprise bearings in engagement with the curved profiles 47 and 49, respectively, of guide means 45. As the guide members 50 and 40 move along the curved profiles 47 and 49 they produce a relative displacement between the longer levers 26, 29 and the shorter levers 32, 35 during the translating movement thereof and this displacement causes an angular adjustment of the location of the toolholder 38, such adjustment being centered around a fixed point of focus in conformity with the declared object of the present invention.

The shape of the curved profiles 47 and 49 as well as the other characteristics of the levers such as the positions of the bearings 40 and 50, the length of the levers and their points of connection to the toolholder 38 are appropriately selected in the design phase of the robot to produce an angular adjustment of the location of the toolholder 38 relative to its longitudinal axis in an arc whose center is formed by a fixed point of focus 55, as shown in FIG. 7, this arc comprising an angle δ of about 90°.

FIG. 7 also illustrates the movement of the toolholder 38 produced by the simultaneous relative displacement of the longer and shorter levers under the action of the lead nuts and guide means described above. The longitudinal axis 52 of the toolholder and consequently also the welding torch inserted therein are always directed toward the fixed point of focus 55 irrespective of the inclination of the toolholder 38, the fixed point of focus 55 being determined by the relative position between the axis 52 and the axis of the threaded shaft 10. As the tubular jacket 20 can also rotate around its own axis through angles of up to 360° or more, the toolholder can be oriented in space according to two degrees of freedom of pivotal movements and the welding torch may assume any location in space according to these two degrees of freedom of movement around a center which constantly remains the fixed point of focus 55. This is in conformity with the declared object of the present invention which, as previously mentioned, is to permit an adjustment of the location of the welding torch and to make corrections at the level of the toolholder head without adjusting the other axes of movement of the robot. As pointed out above, this simplifies programming of the robot according to the invention and renders its operation more reliable in comparison with similar conventional robots.

Although a preferred embodiment of the invention has thus been described in detail and illustrated in the accompanying drawings, it is to be understood that the invention is not limited to this precise embodiment and that numerous changes and modifications obvious to one skilled in the art may be made therein without departing from the scope of the invention as defined by the appended claims.

I claim:

1. An industrial robot having a plurality of axes of movement and comprising: a moveable base; a first angularly movable parallelogram linkage mounted for pivotal movement on a fixed support of said base; a second angularly movable parallelogram linkage mounted for pivotal movement on top of said first parallelogram linkage; a fixed toolholder head support connected to a distal end of said second parallelogram linkage, a fixed focus toolholder head capable of carrying out two angular movements and connected to said fixed toolholder head support, and a toolholder pivotally mounted at a distal end of said toolholder head, characterized in that said toolholder head further comprises a threaded shaft having a first portion coupled to a first lead nut for imparting translating movement to a first pair of parallel levers and a second portion coupled to a second lead nut for imparting translating movement to a second pair of parallel levers, said first portion of said threaded shaft having a length and pitch about twice the length and pitch of said second portion, said pairs of parallel levers supporting at their distal ends said toolholder, and a tubular rotatable jacket extending coaxially of and surrounding said threaded shaft and provided with guide means engaging guide members on said pairs of levers to produce relative movement of the latter and thereby an angular displacement of said toolholder about its longitudinal axis and a fixed point of focus.

2. An industrial robot as claimed in claim 1, wherein said guide means for producing relative movement of said pairs of levers is formed by a pair of flat members each having a differently curved profile forming an outer and an inner profile, the latter being formed by an upper portion of an elongated slot provided in said flat members.

3. An industrial robot as claimed in claim 2, wherein said guide members on said first pair of parallel levers translated by said first lead nut are in engagement with said outer profile of said guide means and said guide members on said second pair of parallel levers translated by said second lead nut are in engagement with said inner profile of said guide means.

4. An industrial robot as claimed in claim 1, wherein said threaded shaft is supported in coaxial holes in said tubular jacket and is connected thereto by bearings permitting relative rotation therebetween.

5. An industrial robot as claimed in claim 1, wherein said threaded shaft is coupled to and arranged to be rotated by an electric motor located outwardly of said tubular jacket.

6. An industrial robot as claimed in claim 1, wherein said tubular jacket is rotatably mounted in a fixed sleeve of said toolholder head by means of a pair of gears one of which is firmly secured to said tubular jacket whereas the other is coupled to a drive shaft of an electric motor with coaxial reduction gear.

* * * * *